(12) United States Patent
Ames et al.

(10) Patent No.: US 7,525,934 B2
(45) Date of Patent: Apr. 28, 2009

(54) MIXED REUSE OF FEEDER LINK AND USER LINK BANDWIDTH

(75) Inventors: William G. Ames, Poway, CA (US); Leonard Norman Schiff, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 555 days.

(21) Appl. No.: 10/940,356

(22) Filed: Sep. 13, 2004

(65) Prior Publication Data

US 2005/0118947 A1      Jun. 2, 2005

Related U.S. Application Data

(60) Provisional application No. 60/506,102, filed on Sep. 24, 2003.

(51) Int. Cl.
  *H04B 7/204*      (2006.01)
(52) U.S. Cl. ........................ 370/319; 455/446
(58) Field of Classification Search .......... 370/316, 370/319
  See application file for complete search history.

(56) References Cited

U.S. PATENT DOCUMENTS

| 5,794,120 | A  | * | 8/1998  | Cutler et al. ............ 455/13.1 |
| 5,862,479 | A  | * | 1/1999  | Cutler et al. ............ 455/428 |
| 6,317,412 | B1 |   | 11/2001 | Natali et al. |
| 6,317,420 | B1 |   | 11/2001 | Schiff ..................... 370/325 |
| 6,507,926 | B1 | * | 1/2003  | Wright .................... 714/776 |
| 6,704,543 | B1 | * | 3/2004  | Sharon et al. ........... 455/12.1 |
| 6,707,916 | B1 | * | 3/2004  | Caso et al. .............. 380/270 |
| 6,810,249 | B1 | * | 10/2004 | Walsh et al. ............. 455/427 |
| 6,813,492 | B1 | * | 11/2004 | Hammill et al. ......... 455/429 |
| 6,836,658 | B1 | * | 12/2004 | Sharon et al. ........... 455/429 |
| 2003/0073436 | A1 | * | 4/2003 | Karabinis et al. ........ 455/429 |
| 2007/0021060 | A1 | * | 1/2007 | Karabinis et al. ........ 455/12.1 |
| 2007/0077884 | A1 | * | 4/2007 | Regulinski et al. ...... 455/12.1 |

FOREIGN PATENT DOCUMENTS

WO      2004/010610 A1      1/2004

OTHER PUBLICATIONS

International Search Report—PCT/US04/030963, International Search Authority—European Patent Office, Mar. 15, 2005.
Written Opinion—PCT/US04/030963, International Search Authority—European Patent Office, Mar. 15, 2005.
Written Opinion—PCT/US04/030963, International Preliminary Examining Authority—US, Sep. 9, 2008.

* cited by examiner

*Primary Examiner*—Andrew Lee
(74) *Attorney, Agent, or Firm*—Amin, Turocy & Calvin, LLP (57) ABSTRACT

An apparatus and method for a wireless communication system in which a forward/uplink portion and a return/uplink portion are assigned within an available frequency bandwidth is disclosed. More particularly, a service area is divided into multiple regions. The assignment of the forward/uplink portion of the return/uplink portion is shuffled in the multiple regions. The apparatus and method may be implemented in a multi-beam wireless communication system.

20 Claims, 11 Drawing Sheets

LAYOUT 1: | FORWARD | RETURN |
LAYOUT 2: | RETURN | FORWARD |

FIG. 8A

LAYOUT 1: | FORWARD | RETURN |
LAYOUT 2: | FORWARD | RETURN |
LAYOUT 3: | RETURN | FORWARD |

FIG. 8B

LAYOUT 1: | FORWARD | RETURN | FORWARD | RETURN | FORWARD | RETURN |
LAYOUT 2: | RETURN | FORWARD | RETURN | FORWARD | RETURN | FORWARD |

MIXED REUSE OF FEEDER LINK AND USER LINK BANDWIDTH

CLAIM OF PRIORITY UNDER 35 U.S.C. §119

The present application for Patent claims priority to Provisional Application No. 60/506,102 entitled "Mixed Reuse of Feeder Link And User Link Bandwith" filed Sep. 24, 2003, and assigned to the assignee hereof and hereby expressly incorporated by reference herein.

CROSS-REFERENCE TO RELATED APPLICATIONS

The present Application is related to co-pending U.S. patent application Ser. No. 10/602,355 filed on Jun. 23, 2003 and entitled "Satellite-Based Programmable Allocation of Bandwidth for Forward and Return Links," and to co-pending U.S. patent application Ser. No. 10/624,257 filed on Jul. 21, 2003 and entitled "A Satellite Communication System Constituted with Primary and Back-up Multi-Beam Satellites," both of which are assigned to the same assignee hereof.

BACKGROUND

I. Field of Invention

The invention generally relates to wireless communication systems, and more particularly to wireless communication systems employing multi-beam satellites and having built-in redundancy.

II. Description of the Related Art

A satellite receives a signal from a transmitter at one location and forwards the signal to a receiver at some other location. By "bouncing" signals off satellites, satellite systems can provide communications virtually anywhere. Satellite systems can also be comparatively inexpensive because very little land-based infrastructure, such as, for example, telephone lines and cellular towers, is needed to cover very large areas and/or very long distances. These advantages make satellite systems ideal for a wide variety of applications, including high speed data communications and/or wireless broadband access.

However, a number of challenges still need to be overcome to provide a more efficient and reliable satellite based data communication service. First of all, while it is possible for a single multi-beam satellite in a geostationary orbit to cover a service area the size of a large country, a relatively large number of beams, in the range of several tens to a few hundred, would be required to achieve a desired communication link capacity. These beams form tightly-packed "cell" patterns to cover the service area to service a large number of users. Such an approach creates inter-beam interference problems affecting the overall efficiency of the system. Such interference needs to be kept to an absolute minimum. Therefore, there is a need to address the inter-beam interference problems to provide a more efficient system.

SUMMARY

Embodiments disclosed herein address the above stated needs by providing a method for security in a data processing system. In one aspect, a method used for a satellite communication system in which a forward/uplink portion and a return/uplink portion are assigned within an available frequency bandwidth comprises dividing a service area into multiple regions, and shuffling the assignment of the forward/uplink portion and the return/uplink portion in the multiple regions. The shuffling of the assignment may comprise assigning a first frequency band to the forward/uplink and a second frequency band to the return/uplink in at least a first region, and assigning the first frequency band to the return/uplink in at least a second region. In such case the shuffling may further assigning the first frequency band to either one of the forward/uplink or the return/uplink in at least a third region; assigning a third frequency band to either one of the forward/uplink or the return/uplink in at least a second region; or assigning a third frequency band to either one of the forward/uplink or the return/uplink in at least a third region. Alternatively, the shuffling of the assignment may comprise assigning a first frequency band to the forward/uplink and a second frequency band to the return/uplink in at least a first region, and assigning the second frequency band to the forward/uplink in at least a second region. In such case, the shuffling may further comprise assigning the second frequency band to either one of the forward/uplink or the return/uplink in at least a third region; assigning a third frequency band to either one of the forward/uplink or the return/uplink in at least a second region; or assigning a third frequency band to either one of the forward/uplink or the return/uplink in at least a third region.

In another aspect, a method for receiving uplink transmission at a satellite in which forward/uplink and return/uplink portions are assigned within an available frequency bandwidth comprises dividing a service area into multiple regions, and receiving the forward/uplink and the return/uplink signals in a mixed mode assignment of the available frequency bandwidth in the multiple regions. Receiving the forward/uplink and the return/uplink signals may comprise receiving the forward/uplink signals using a first frequency band and the return/uplink using a second frequency band in at least a first region, and receiving the return/uplink signals using the first frequency in at least a second region. In such case, receiving the forward/uplink and the return/uplink signals may further comprise receiving either one of the forward/uplink or the return/uplink using the first frequency in at least a third region; receiving either one of the forward/uplink or the return/uplink signals using a third frequency in at least a second region; or receiving either one of the forward/uplink or the return/uplink signals using a third frequency in at least a third region. Alternatively, receiving the forward/uplink and the return/uplink signals may comprise receiving the forward/uplink signals using a first frequency band and the return/uplink using a second frequency band in at least a first region, and receiving the forward/uplink signals using the second frequency in at least a second region. In such case, receiving the forward/uplink and the return/uplink signals may further comprises receiving either one of the forward/uplink or the return/uplink using the second frequency in at least a third region; receiving either one of the forward/uplink or the return/uplink signals using a third frequency in at least a second region; or receiving either one of the forward/uplink or the return/uplink signalss using a third frequency in at least a third region.

In yet another aspect, a method for uplink transmission from a gateway in which forward/uplink portion is assigned within an available frequency bandwidth comprises dividing a service area into multiple regions, transmitting the forward/uplink signals using a first frequency band if the gateway is in a first region, and otherwise transmitting the forward/uplink signals using a second frequency band.

In still another aspect, a method for uplink transmission from a terminal in which return/uplink portion is assigned within an available frequency bandwidth comprises dividing a service area into multiple regions, transmitting the return/ uplink signals using a first frequency band if the terminal is in a first region, and otherwise transmitting the return/uplink signals using a second frequency band.

In further aspects, an apparatus for a satellite communication system in which a forward/uplink portion and a return/uplink portion are assigned within an available frequency bandwidth may comprise means for dividing a service area into multiple regions, and means for shuffling the assignment of the forward/uplink portion and the return/uplink portion in the multiple regions. An apparatus used for receiving uplink transmission at a satellite in which forward/uplink and return/uplink portions are assigned within an available frequency bandwidth comprises means for dividing a service area into multiple regions, and means for receiving the forward/uplink signals and the return/uplink signals in a mixed mode assignment of the available frequency bandwidth in the multiple regions. An apparatus for uplink transmission from a gateway in which forward/uplink portion is assigned within an available frequency bandwidth comprises means for dividing a service area into multiple regions and means for transmitting the forward/uplink signals using a first frequency band if the gateway is in a first region, and otherwise transmitting the forward/uplink signals using a second frequency band. An apparatus for uplink transmission from a terminal in which return/uplink portion is assigned within an available frequency bandwidth comprises means for dividing a service area into multiple regions, means for transmitting the return/uplink signals using a first frequency band if the terminal is in a first region, and otherwise for transmitting the return/uplink signals using a second frequency band.

BRIEF DESCRIPTION OF THE DRAWINGS

Various embodiments will be described in detail with reference to the following drawings in which like reference numerals refer to like elements, wherein.

DETAILED DESCRIPTION

Generally, embodiments disclose a mixed use of an uplink spectrum between the forward uplink and return uplink of a wireless communication system. In the following description, specific details are given to provide a thorough understanding of the embodiments. However, it will be understood by one of ordinary skill in the art that the embodiments may be practiced without these specific details. Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, a terminal is adapted for communication with a satellite, and may be one of a plurality of different types of fixed and mobile user terminals including, but not limited to, a cellular telephone, wireless handset, a wireless modem, a data transceiver, a paging or position determination receiver, or mobile radio-telephones. Furthermore, a terminal may be hand-held, portable as in vehicle-mounted (including for example cars, trucks, boats, trains, and planes), or fixed, as desired. A terminal may be referred in as a wireless communication device, a user terminal, a mobile station, a mobile unit, a subscriber unit, a mobile radio or radiotelephone, a wireless unit, or simply as a "user," a "subscriber," a "mobile" in some communication systems.

In addition, a satellite can use either TDMA or CDMA type modulation or air interfaces for the signals on the forward or reverse links, or a combination thereof. A spread spectrum (SS) code division multiple access (CDMA) technique currently used in satellites is similar to the TIA/EIA Interim Standard, "Mobile Station-Base Station Compatibility Standard for Dual-Mode Wideband Spread Spectrum Cellular System" TIA/EIA/IS-95, Jul. 1993, referred to as the Telecommunications Industry Association/Electronic Industries Association (TIA/EIA) Standard IS-95. However, other spread spectrum and CDMA techniques and protocols, or even some types of Time Division Multiple Access (TDMA) systems can be employed. Other communications systems are described in the International Mobile Telecommunications System 2000/Universal Mobile Telecommunications System or IMT-2000/UM standards, covering what are commonly referred to as wideband CDMA (WCDMA), cdma2000 (such as cdma2000 1×-rxtt cdma2000 1×, 3×, or MC standards, for example) or TD-SCDMA. Satellite based communication systems also utilize these or similar known standards. It should be noted here that various modulation schemes may be used.

Figure 1:
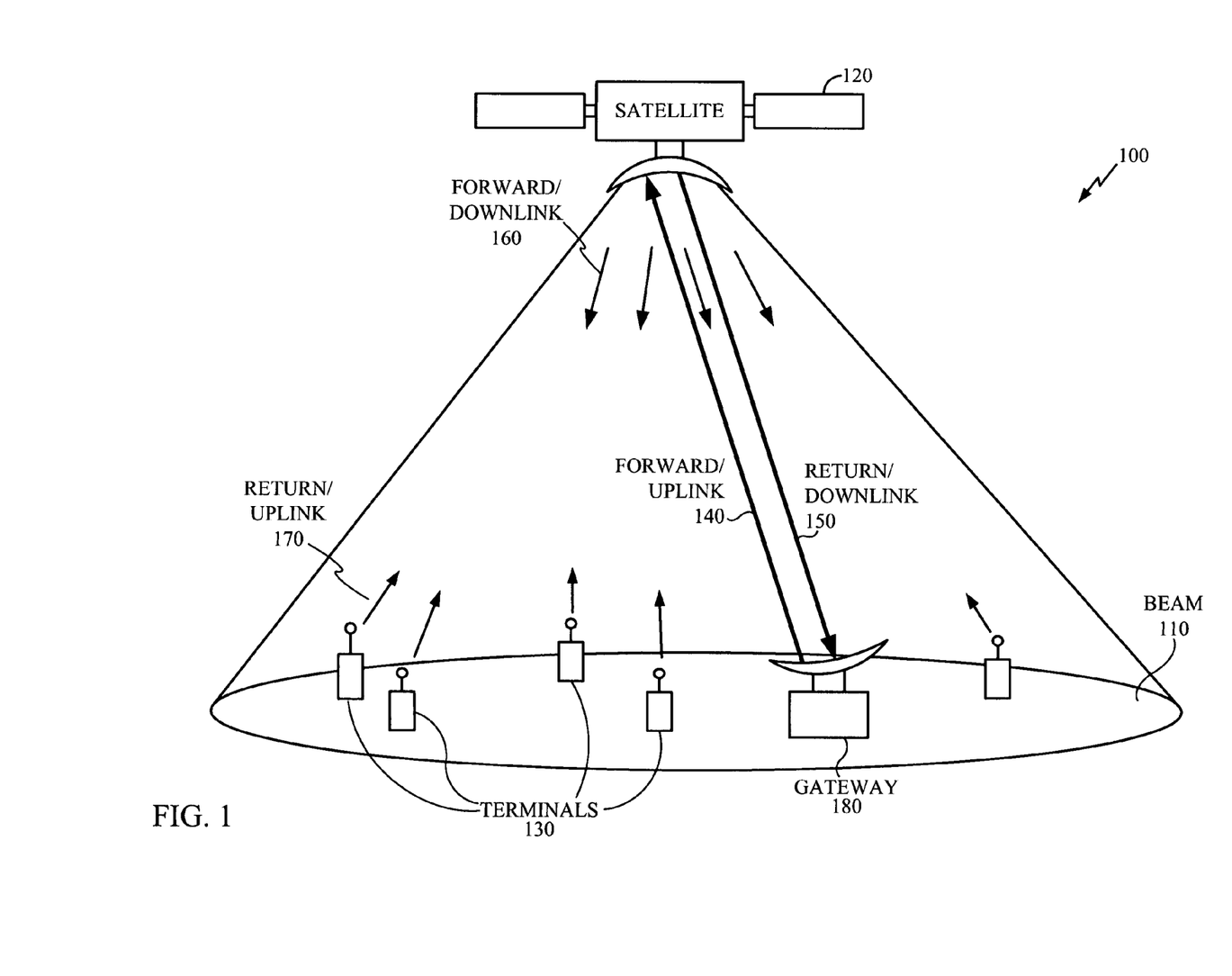
FIG. 1 shows an example satellite communication system.

FIG. 1 shows an example wireless communication system 100, comprising a satellite 120 that projects a beam 110 onto a region covering a service area. There may be several ground stations within beam 110, including a gateway 180 and a number of terminals 130. Gateway 180 could, for instance, provide access to the Internet, wireless broadband or some other network (not shown). In such case, terminals 130 may communicate with the external network through satellite 120 and gateway 180.

Beam 110 includes four types of communication links. A forward/uplink 140 which includes signals transmitted from gateway 180 to satellite 120. A return/downlink 150 which includes signals transmitted from satellite 120 to gateway 180. A forward/downlink 160 which includes signals transmitted from satellite 120 to terminals 130 in beam 110. A return/uplink 170 which includes signals transmitted from terminals 130 to satellite 120. Accordingly, forward/uplink 140 and return/uplink 170 together comprise the uplink, which includes signals going to satellite 120. Forward/downlink 160 and return/downlink 150 together comprise the downlink, which includes signals being transmitted from the satellite. Similarly, forward/uplink 140 and forward/downlink 160 together comprise the forward link, which includes signals going from gateway 180 to terminals 130. Return/uplink 170 and return/downlink 150 together comprise the return link, which includes the signals going from terminals 130 to gateway 180. Furthermore, forward/downlink 160 and return/uplink 170 together comprise a user link, which includes signals transmitted and received by a terminal. Forward/uplink 140 and return/downlink 150 together comprise a feeder link, which includes signals transmitted and received by a gateway.

Satellite 120 is allocated a certain amount of frequency bandwidth or spectrum for use in communication with gateway 180 and terminals 130. In order for satellite 120 to send and receive signals without the signals interfering with one another, satellite 120 often separates or divides the uplink and the downlink into separate frequency bands. It is noted that the uplink and downlink bands are neither necessarily nor typically frequency contiguous. For example, the Ku band has a noncontiguous allocation of frequencies as between the uplink and downlink portions. More particularly, the Ku band downlink frequency allocation is 11.7 GHz to 12.2 GHz, while the Ku band uplink frequency allocation is 14.0 GHz to 14.5 GHz.

Figure 2:
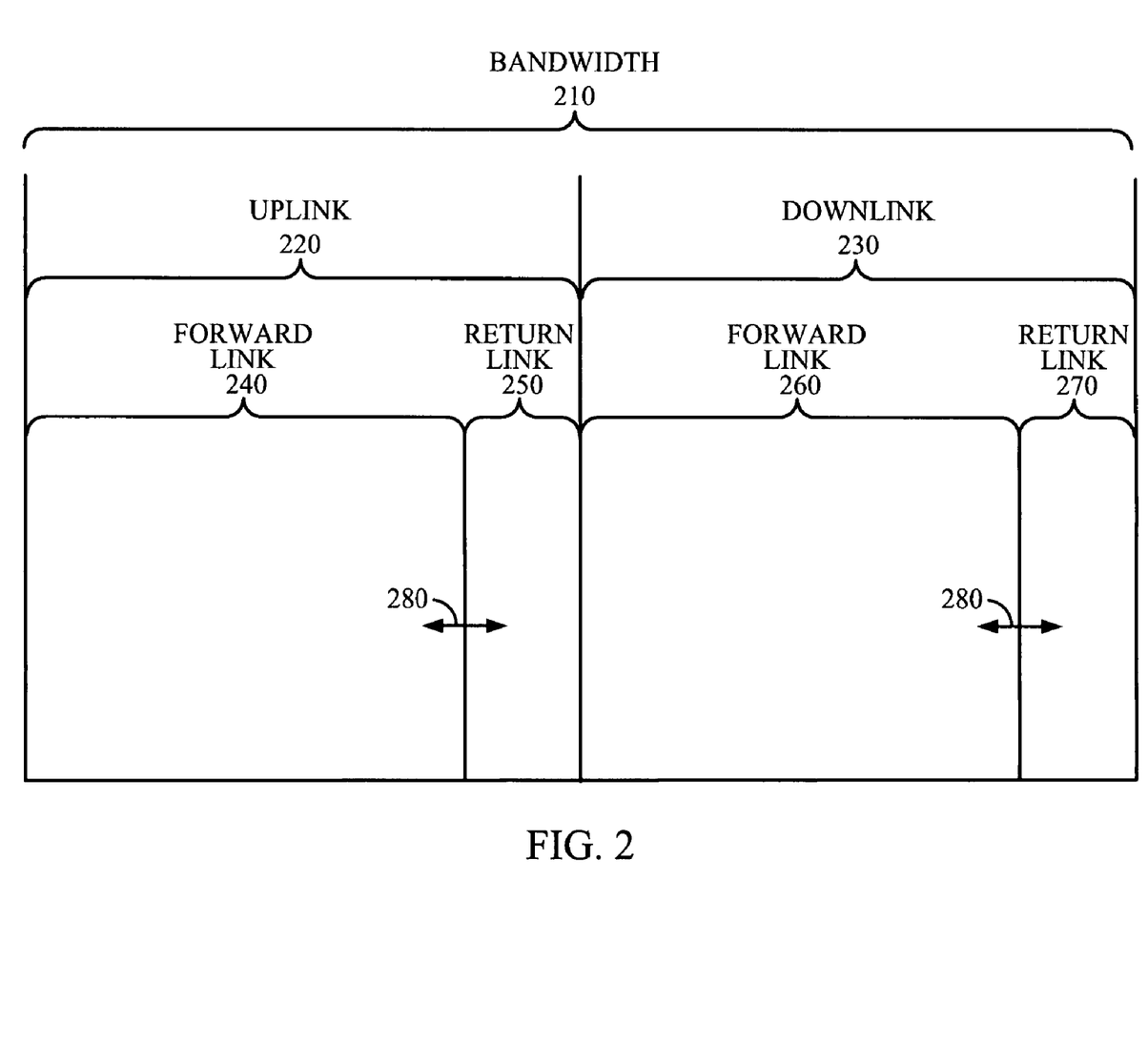
FIG. 2 shows an example division of a bandwidth among different communication links.

FIG. 2 shows an example division of a bandwidth among various communications links. As shown, a bandwidth 210 is divided between an uplink 220 and a downlink 230. Each portion, block or section of bandwidth 210 is divided into a forward and return portions. Namely, the bandwidth available for uplink 220 is divided into forward link portion 240 and a return link portion 250. The bandwidth available for downlink 230 is divided into a forward link portion 260 and a return link portion 270. Boundaries 280 between the forward and return portions of bandwidth may be set based on the needs of the system. That is, the ratio of forward-to-return bandwidth may be changed.

Figure 3:
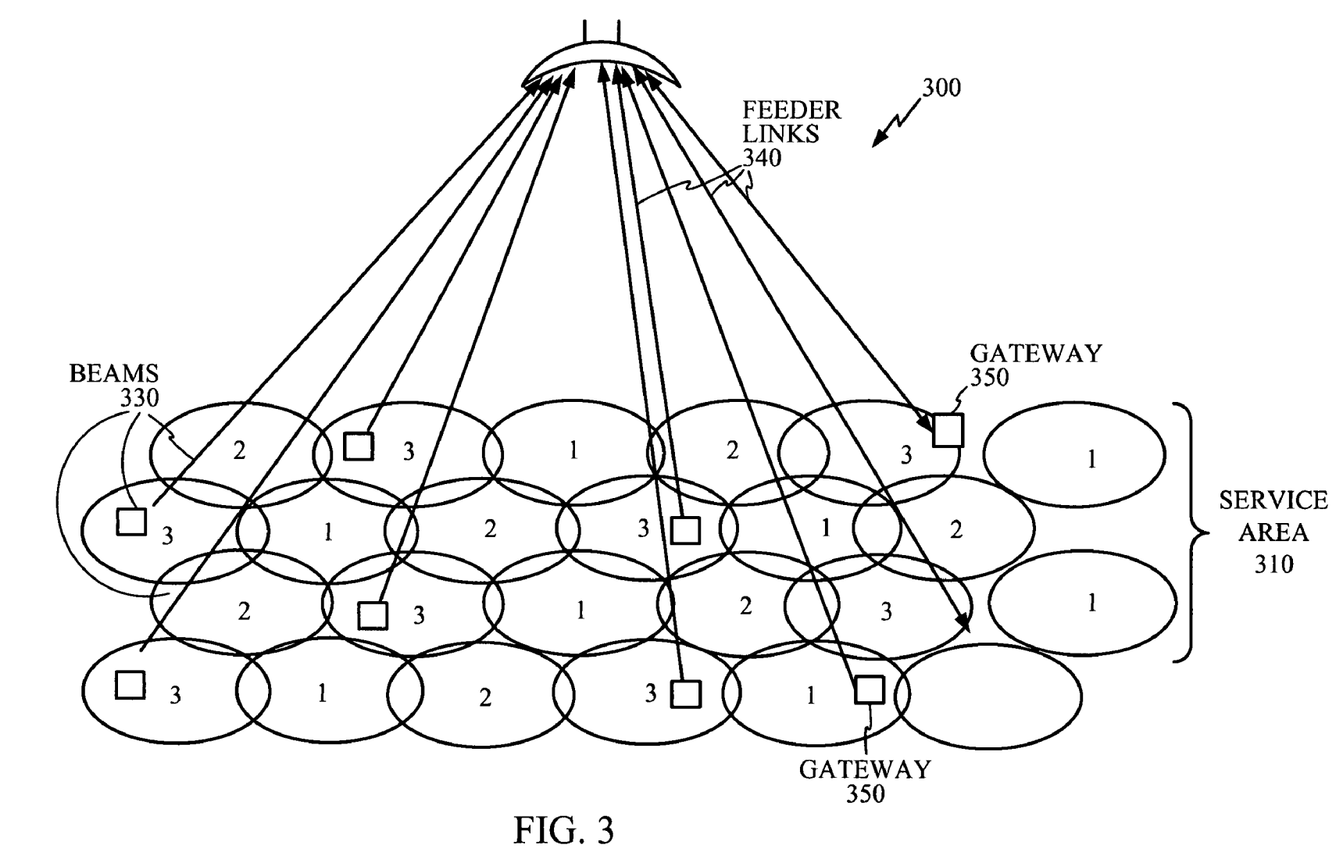
FIG. 3 shows an example beam pattern in a multi-beam satellite communication system.

In some systems, a satellite projects multiple beams rather than a single beam onto a region covering a service area. FIG. 3 shows an example multi-beam satellite communication system 300. In system 300, satellite 320 divides its service area 310 into multiple beams 330. Each beam 330 is similar to beam 110 of FIG. 1 in that beam 330 may service a number of ground stations, including potentially many terminals (not shown) and possibly a gateway 350. Multiple-beam systems can be used to increase overall data capacity through the system by reusing the available frequency bandwidth.

In system 300, service area 310 is divided into 24 beams, wherein each beam uses approximately one-third of the available frequency bandwidth for the return/uplink and the forward/downlink such that eight of the 24 beams use the same frequency band.

This arrangement can potentially increase the total data capacity through the system by the number of beams, N=24, divided by the number of frequency divisions, K=3, for an increase of a factor of 8.

As shown, beams 330 that use a first band of the available frequency bandwidth is labeled as "1," beams 330 that use a second band is labeled as "2," and beams 330 that use a third band is labeled as "3." Beams 330 are arranged so that no two beams that use the same frequency band are adjacent. Separating the beams that use the same frequency band reduces interference among beams. In addition, eight gateways 350 may support the twenty four beams 330. This is because three beams share the available bandwidth and each gateway 350 can use the entire available bandwidth such that a single gateway can service three beams. Accordingly, each feeder link 340 includes both the forward/uplink and the return/downlink between satellite 320 and respective gateways, and each feeder link 340 carries data for three beams supported by respective gateways. It is to be noted that a gateway may support more or less than three beams depending on the reuse scheme and other constraints known to system designers.

Figure 4:
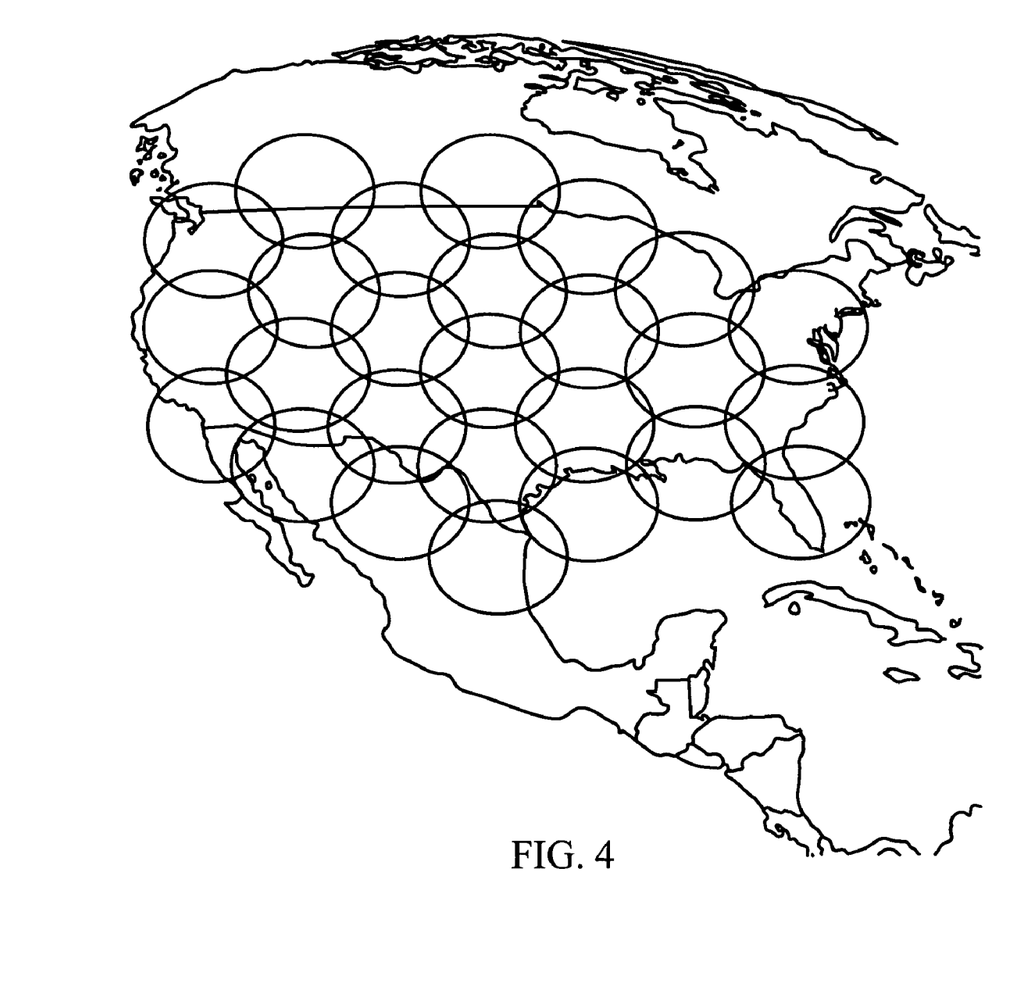
FIG. 4 shows how a beam pattern could be projected on the CONUS.

Also, it is to be noted here that satellite 320 employs predetermined or designed beam patterns within a given geographical region or ""footprint" of the satellite. The beam patterns can vary from circular to more elongated elliptical, or have various irregular shapes or gain distribution patterns, as would be known to those skilled in the art. Any suitable pattern or set of patterns may be used according to a specific communication system design, and such patterns do not operate as a limitation for embodiments the invention. For example, FIG. 4 shows how the beam pattern of FIG. 3 could be projected on the continental United States (CONUS). More or fewer numbers of beams may be used depending on the type or capacity of signals being used, geographical regions to be covered, number of terminals to be serviced, power available, frequencies available, and other satellite or system design constraints known to system designers. Accordingly, there may be frequency reuse schemes, other than the example shown in FIG. 3, that use more or less than 24 beams, wherein each beam uses more or less than one-third of the available frequency bandwidth. In addition, gateways 350 in system 300 are in beams labeled "3." However, the location of gateways 350 may be changed without affecting the operation of the system. For example, gateways 350 may be placed only in beams labeled "1" or only in beams labeled "2," or each gateway 350 may be placed in any one of the three beam.

Moreover, in some systems, the beam pattern may be produced by a plurality of multi-beam satellites. A typical satellite communications system may use several satellites in known orbital patterns to provide service for one or more terminals by transferring signals between, that is to or from, terminals and one or more gateways, ground stations or hubs. Such systems have the ability to provide communications capabilities or coverage over large geographical areas or regions. A satellite communications system may use, for example, 48 or more satellites residing in a series of well defined orbital planes, for example 6, to provide nearly global coverage.

Figure 5:
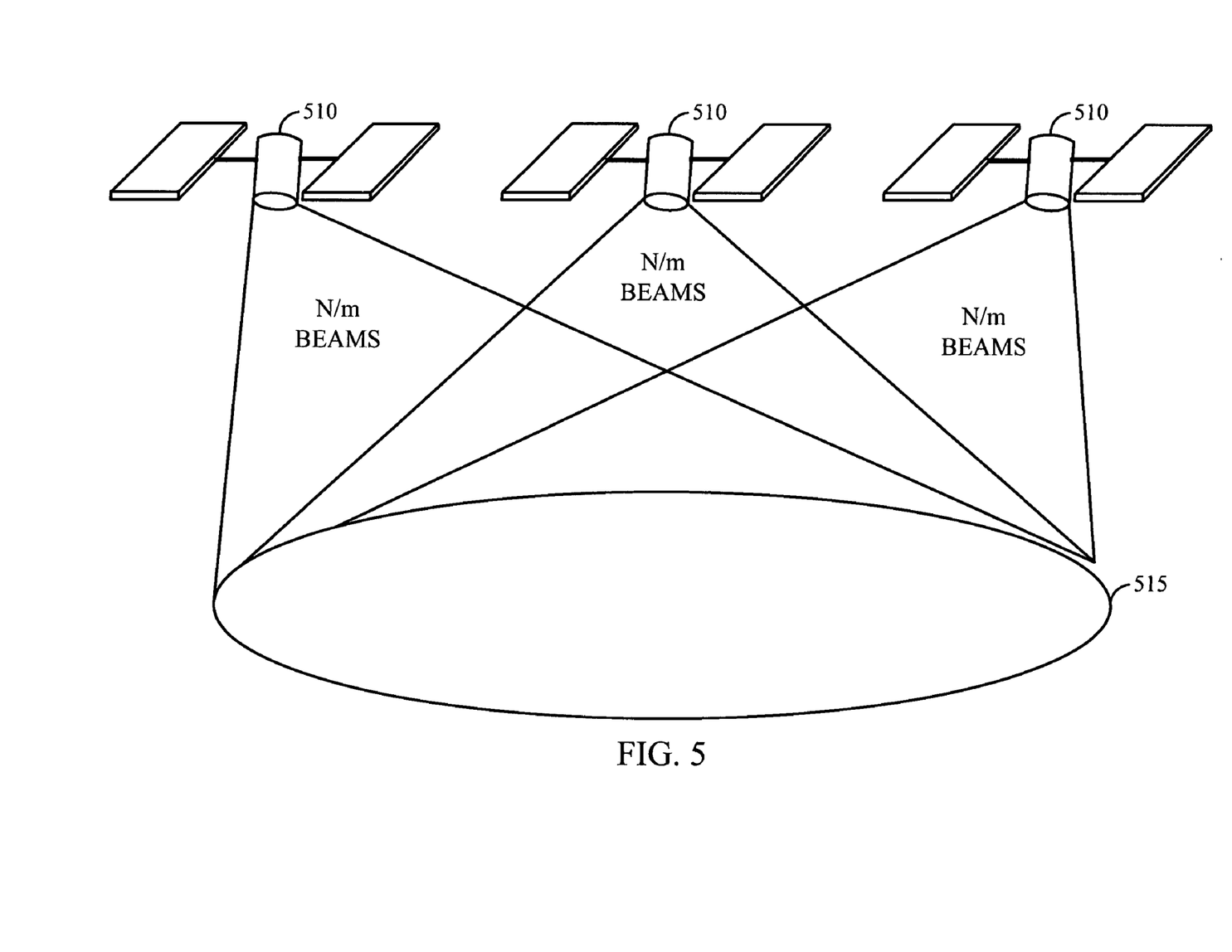
FIG. 5 shows an example multi-beam satellite communication system using a plurality of satellites.

FIG. 5 shows multi-beam satellite communication system 500 using a plurality of multi-beam satellites for a service area. System 500 may be formed using a series of multi-beam satellites 510, there being 'm' such satellites in the communication system, where m is an integer and has a value greater than 1. Each satellite in system 500 is equipped or configured to project N/m beams to a region covering a service area 515 to make it possible to provide services for user terminals by transferring data and/or other communication signals, or commands, within the service area 515. When taken together, the m satellites, each producing N/m beams, generate or provide the N beams desired to cover the service area. For the illustrated example, m is equal to 3, although other values may also be used, as desired. Depending on the size of the chosen service area for the communication system, N typically may range from around 30 to 120 total beams within service area 515. The value selected for N will vary for different communication systems, and is based on many well known factors. For example, the overall size of the satellite footprint or service area to be covered, the quantity of traffic or signals to be transferred, and at what data rates, as well as the anticipated operating frequencies or reuse patterns, the beam shapes, and so forth, as would be known to those skilled in the art.

Satellites, such as satellite 510 may be placed into one of a variety of orbits, for example, a low Earth orbit (LEO); a middle Earth orbit (MEO); or a geosynchronous orbit (GEO), each having well known or understood characteristics. A geosynchronous orbit is sometimes referred to as a geostationary orbit. For example, a geosynchronous orbit may have an orbital period of 23 hours, 56 minutes, and 41 seconds, which has the effect of causing a satellite to appear to reside in a stationary location above the surface of the Earth. Except for the fact that each satellite 510 is multi-beam type, satellites 510 otherwise represent a broad range of communication satellites whose structure and operation are known in the art. Any suitable ones of these known or to be developed satellites may be employed to practice the present invention. However, the satellites need not be identical in all aspects as longs as they provide the desired beam coverage, and associated power and command controls within the communication system.

Figure 6:
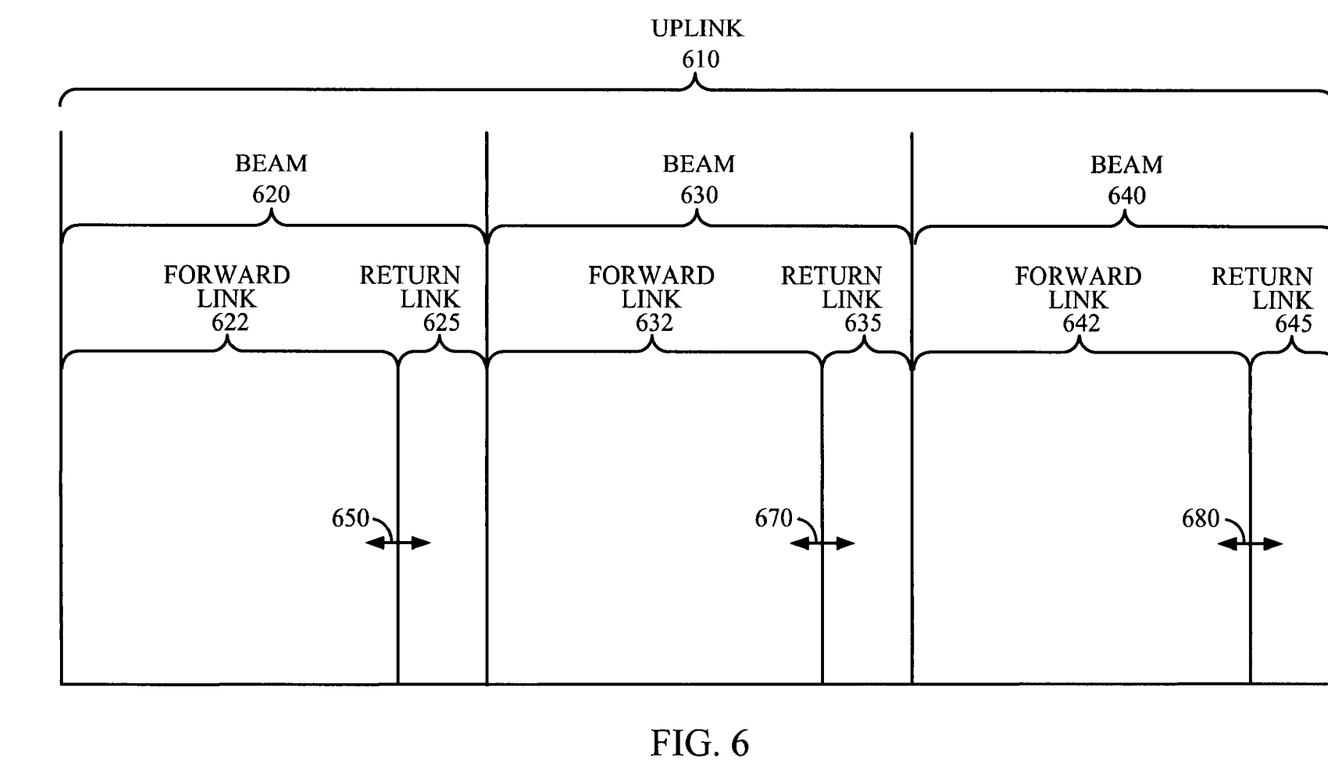
FIG. 6 shows an example division of a bandwidth among different communication link in a multi-beam satellite communication system.

In system 500, the spectrum allocated to a satellite 510 is divided between an uplink and downlink. The frequency bandwidth available for each of the uplink and downlink are then divided and allocated to the multiple beams. FIG. 6 shows an example division of a spectrum among three beams in an uplink 610. As shown, uplink 610 is divided into three beam portions, 620, 630 and 640. Each beam portion is divided further into forward and return portions. Specifically, beam 620 includes a forward link 622 and return link 625. Beam 630 includes forward link 632 and 635. Beam 640 includes forward link 642 and return link 645. The boundaries 650, 660 and 670 between the various portions may be set based on the needs of the system.

As discussed above, satellite systems, whether it be single beam or multibeam, use a fixed assignment of the uplink bandwidth, in the sense that the forward/uplink uses a fixed portion of the uplink bandwidth and the reverse/uplink uses the remaining portion of the uplink bandwidth. However, the fixed use of the assigned spectrum may cause problems. Particularly, multi-beam satellite systems brings new challenges due to the combination of the simultaneous power level transmissions from multiple terminals into neighboring satellite off-axis locations in the GEO arc as well as the desire to keep transmit power levels high enough to generate high signal to noise ratio (SNR) levels that produce high spectral efficiency in the broadband use of the allocated spectrum.

Accordingly, the embodiments described use a "shuffling scheme" for a mixed assignment of the uplink bandwidth between the forward/uplink and the return/uplink. Typically, frequency reuse schemes are considered and well known for application within either the feeder links or the user links. Reuse schemes such as 1:1, 3:1, 4:1 up to 7:1 are well known. Particularly, 3:1 is a desirable scheme for either the feeder link or user links seperately and have been applied to terrestrial systems for many years in the cellular industry. However, the shuffling scheme as described below mixes the transmissions of user links and the feeder links in the same spectrum allocation. This produces a mixed reuse pattern of spectrum geographically throughout a multi-beam system.

More particularly, the shuffling scheme leverages design differences in gateways and terminals, e.g., antenna shape and/or size, to provide a more beneficial and/or efficient use of the allocated spectrum. Generally, the shuffling scheme allows reuse of the feeder link frequency by terminals and reuse of the user link bandwidth by the gateways. This reduces the aggregate off-axis power, thereby allowing the increase in power terminals in a satellite system, and/or increase in the quantity of simultaneous transmissions in the same bandwidth channel until the regulation level is met. In addition, interference power levels are kept within constraints. Therefore, a more efficient use of the allocated spectrum is achieved than would otherwise be possible when feeder link uplink bandwidth and user uplink bandwidth are kept segregated.

Figure 7:
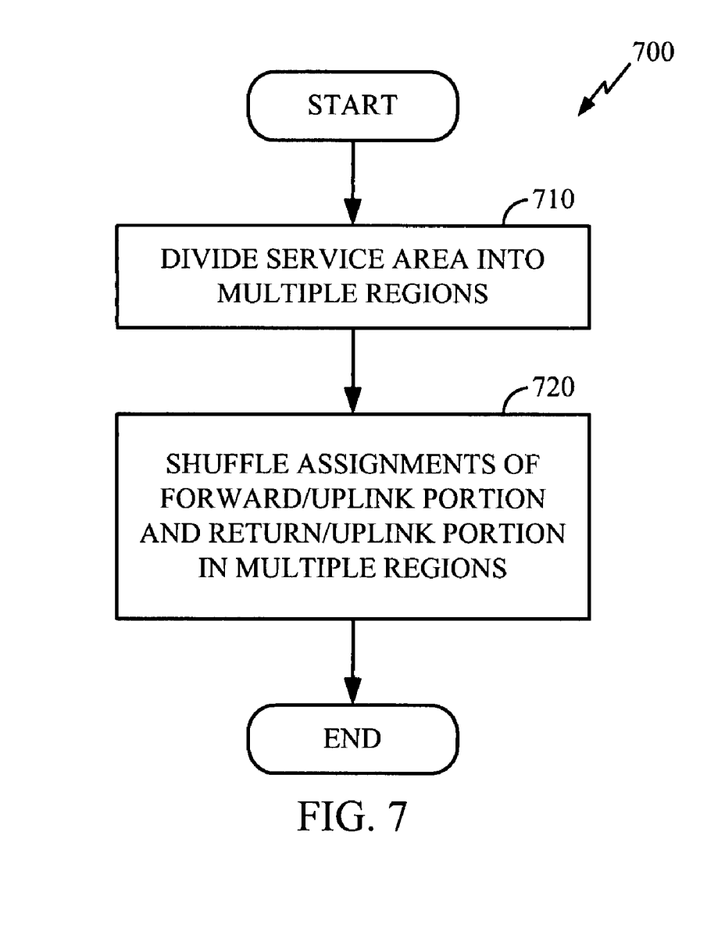
FIG. 7 shows an example method for implementing a shuffling scheme.

FIG. 7 shows an example method 700 for implementing a shuffling scheme for use in a system in which a forward/uplink portion and a return/uplink portion are assigned within an available bandwidth. Method 700 may be used in a single beam satellite system or a multi-beam satellite system with one or a plurality of satellites. In method 700, a service area is divided (710) into multiple regions. The assignments of the forward/uplink portion and the return/uplink portion within the available frequency are then shuffled (720) in the multiple region. When the assignments are shuffled, the forward/uplink may use one portion of the uplink bandwidth in one region and use a different portion of the uplink bandwidth in another region. Similarly, the return/uplink may use one portion of the uplink bandwidth in one region and use a different portion of the uplink bandwidth in another region.

Figure 8A:
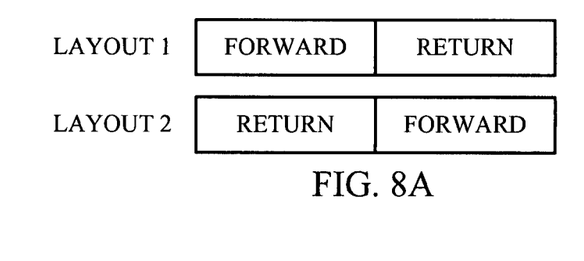
FIGS. 8A and 8B show examples of shuffling schemes.

FIG. 8A shows an example shuffling scheme for one beam when the ratio of forward-to-return bandwidth is approximately 1:1. Namely, approximately half of the uplink bandwidth is feeder link and half is user link. As shown, in a first layout, the forward/uplink is assigned to the first half and the return/uplink is assigned to the second half of the uplink bandwidth. In a second layout, the return/uplink is assigned to the first half and the forward/uplink is assigned to the second half of the uplink bandwidth. Therefore, two layouts or a reshuffling of two can be produced.

Figure 8B:
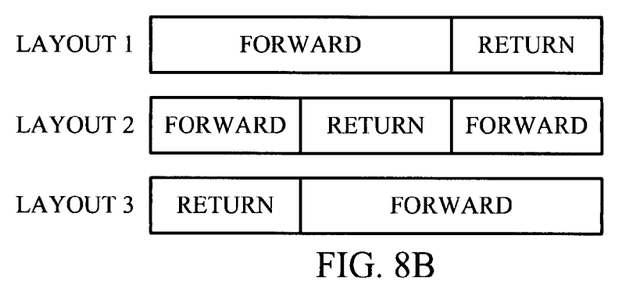

FIG. 8B shows an example shuffling scheme for one beam when the ratio of forward-to-return bandwidth is approximately 2:1. Namely, approximately ⅔ of the uplink bandwidth is feeder link and ⅓ is user link. In such case, the forward/uplink is assigned to the first ⅔ and the return/uplink is assigned to the remaining ⅓ of the uplink bandwidth in a first layout. In a second layout, the forward/uplink is assigned to the first and last ⅓, and the return/uplink is assigned to the middle ⅓ of the uplink bandwidth. In a third layout, the return/uplink is be assigned to the first ⅔ and the forward/uplink is assigned to the remaining ⅓ of the uplink bandwidth. Therefore, a reshuffling of three can be produced.

Generally, if the bandwidth usage is a rational fraction, x/y and (y−x)/y, then there are y-choose-x layouts or combinations. Here, y-choose-x can be expressed mathematically as follows.

$$y!/[(y-x)!*x!].$$

Figure 9:
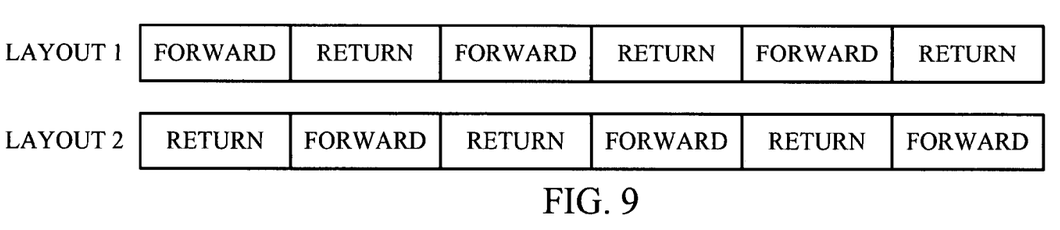
FIG. 9 shows another example of a shuffling scheme.

Also, for multi-beam satellite systems, the layouts produced for one beam may be repeated for the multiple beams. For example, FIG. 9 shows an example shuffling scheme for a frequency reuse scheme of 3:1 which divides the uplink bandwidth into three beams, when the ratio of forward-to-return bandwidth is approximately 1:1. As shown, in a first layout, each beam has the forward/uplink assigned to the first half and the return/uplink assigned to the second half of the available bandwidth within the uplink bandwidth. In a second layout, each beam has the return/uplink assigned to the first half and the forward/uplink assigned to the second half of the available bandwidth within the uplink bandwidth.

Figure 10A:
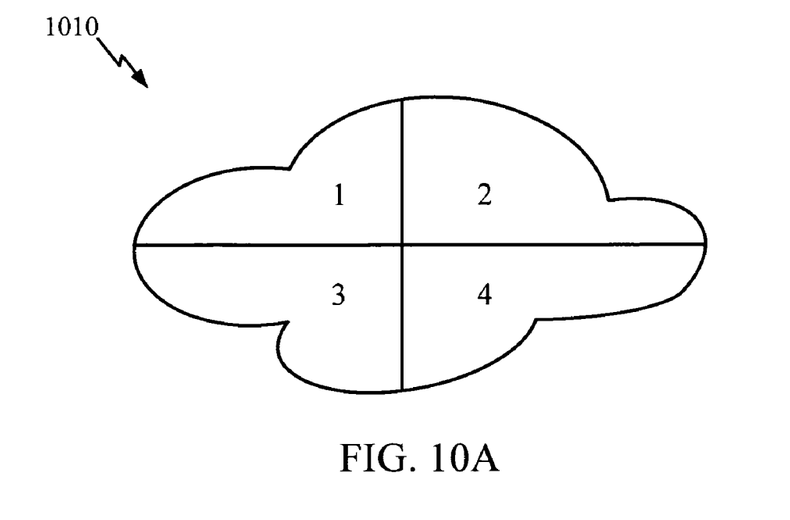
FIGS. 10A and 10B show examples of service areas divided into four regions.
Figure 10B:
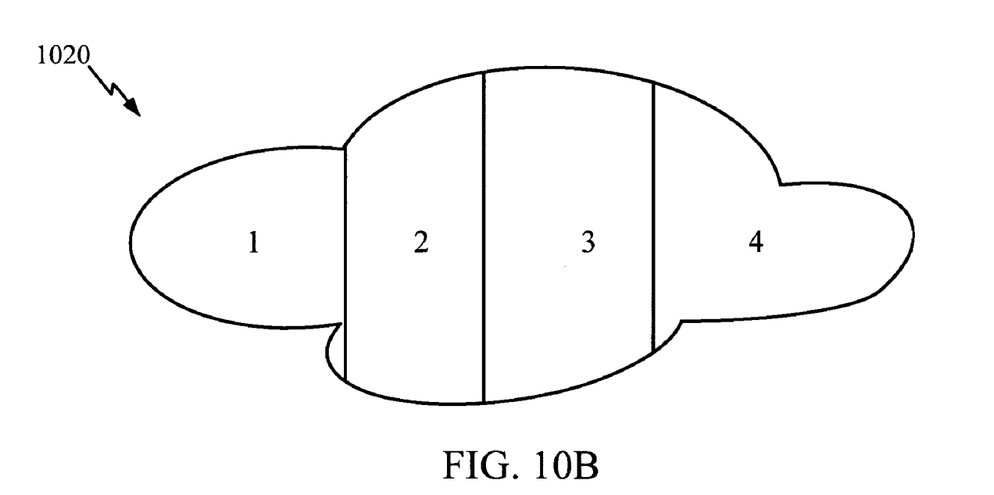

The multiple layouts produced by the different shuffling schemes may be used in the multiple regions of a divided service area. If there are more regions of the service area than there are available layouts, more than one region may use a same layout. For example, when two layouts are available as shown in FIG. 8A, a first region may use the first layout and a second region may use the second layout. If there are more than two regions, then the additional regions may use either the first layout or the second layout based on how the service area is divided. FIGS. 10A and 10B show examples of service areas divided into four regions. For service area 1010, the first and fourth regions may use one layout while the second and third regions may use the other layout.

For service area 1020, the first and third regions may use one layout while the second and fourth regions may use the other layout. Here, if three layouts are available as shown in FIG. 8B, two of the four regions would use the same layout. For service area 1010, the first and fourth regions or second and third regions may use one layout while the remaining layouts are assigned respectively to the remaining regions.

If there are less regions than there are available layouts, then a set of layouts may be selected from the available layouts for the regions based on the system performance, needs and other known constraints. For example, when three layouts are available as shown in FIG. 8B for two regions, one region may use the first layout and the other region may use the second or third layout, or one region may use the second layout ad the other region may use the first or third layout, or one region may use the third layout and the other region may use the first or second layout.

Figure 11:
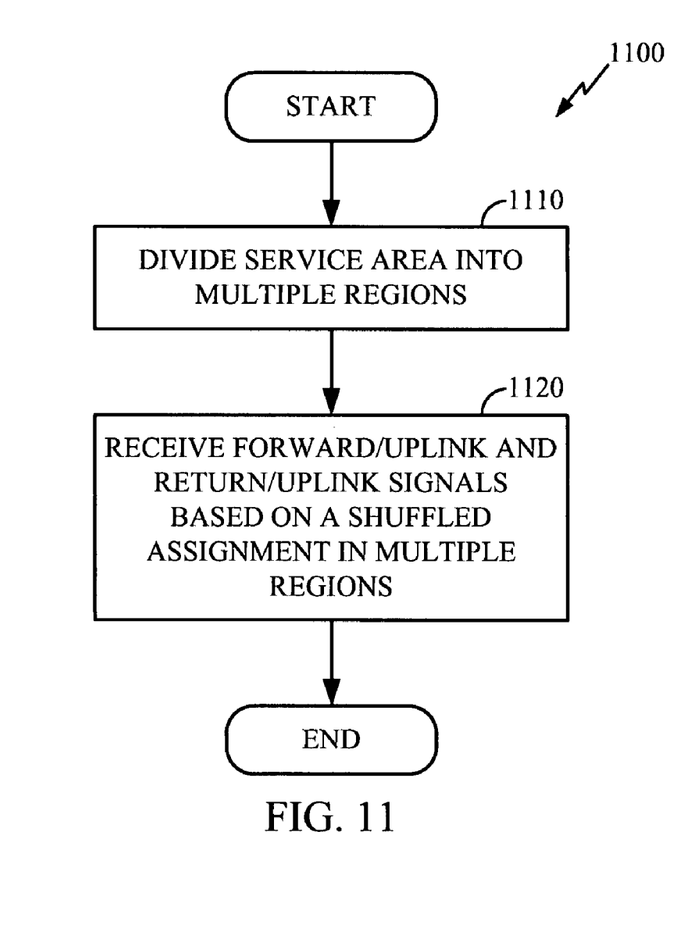
FIG. 11 shows an example method used for communication by a satellite.
Figure 12:
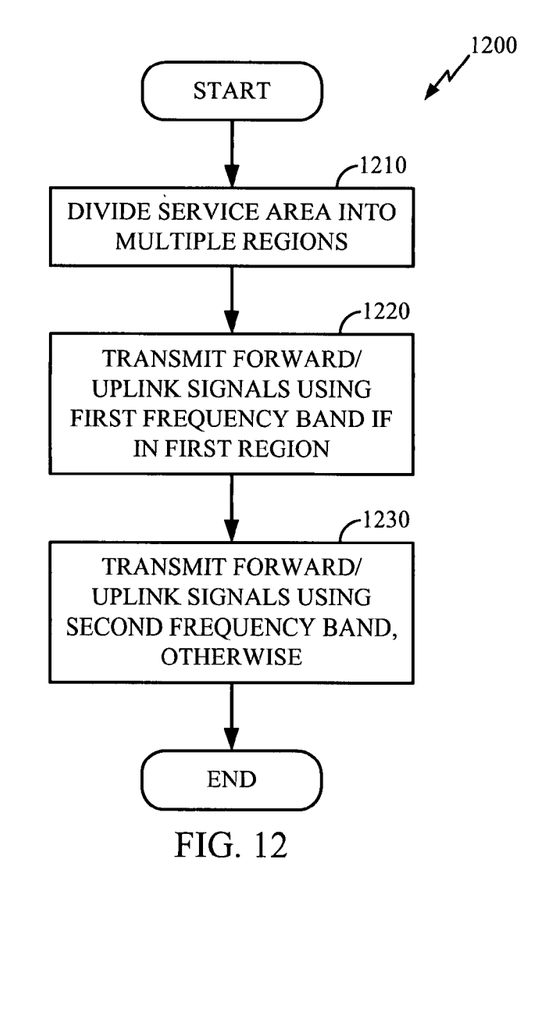
FIG. 12 shows an example method used for transmissions by a gateway.
Figure 13:
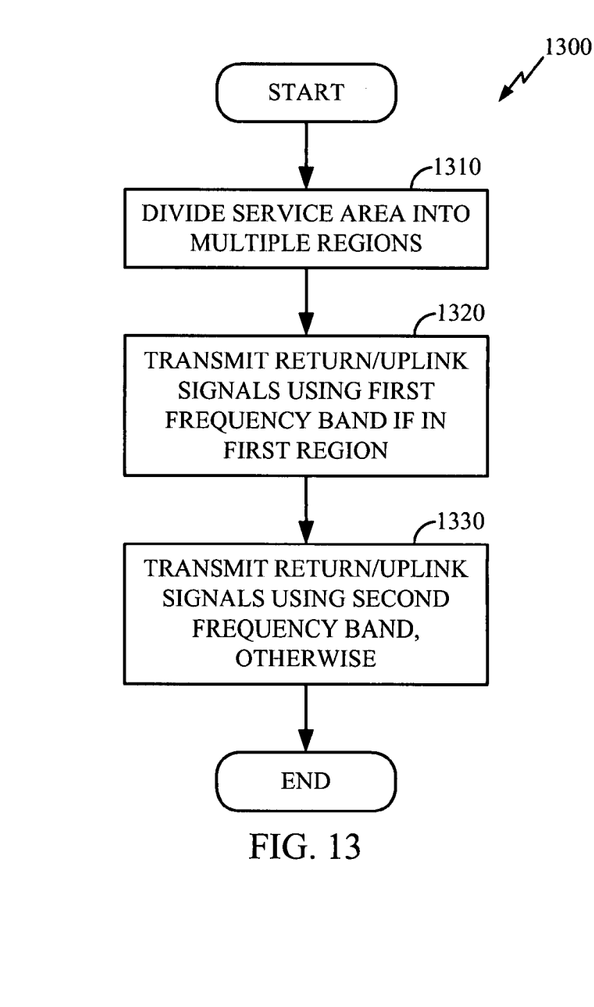
FIG. 13 shows an example method used for transmissions by a terminal.

Therefore, satellite(s), gateway(s) and terminal(s) operate to receive and/or transmit signals in a mixed reuse of the available frequency. More particularly, FIG. 11 shows an example method 1100 used for receiving uplink transmission at a satellite in which forward/uplink and return/uplink portions are assigned within an available frequency bandwidth. In method 1100, a service area is divided (1110) into multiple regions. The forward/uplink and the return/uplink signals are then received (1120) by the satellite based on a shuffled assignment of the available frequency bandwidth in the multiple regions. Similarly, FIG. 12 shows an example method used for uplink transmission from a gateway in which forward/uplink portion is assigned within an available frequency bandwidth. In method 1200, the service area is also divided (1210) into multiple regions. The gateway then transmits (1220) the forward/uplink signals using a first frequency band if the gateway is in a first region, and transmits (1230) the forward/uplink signals using a second frequency band, otherwise. For example, if the gateway is in a second region, the gateway would transmit the forward/uplink signals using the second frequency band. Furthermore, FIG. 1300 shows a method 1300 used for uplink transmission from a terminal in which return/uplink portion is assigned within an available frequency bandwidth. In method 1300, the service area is divided (1310) into multiple regions. A terminal then transmits (1320) the return/uplink using a first frequency band if the terminal is in a first region, and transmits (1330) the return/uplink using a second frequency band, otherwise. For example, if the terminal is in a second region, the terminal would transmit the return/uplink signals using the second frequency.

It should be noted that the satellite, gateway and terminals would be implemented with a machine readable medium and a processor, as well as other known elements, to perform the respective methods 1100, 1200 and 1300. Also, methods 1100, 1200 and 1300 may be used for single beam systems and multi-beam systems. Finally, assume, for example, that a service area supported by one or more multi-beam satellites is the CONUS.

Figure 14:
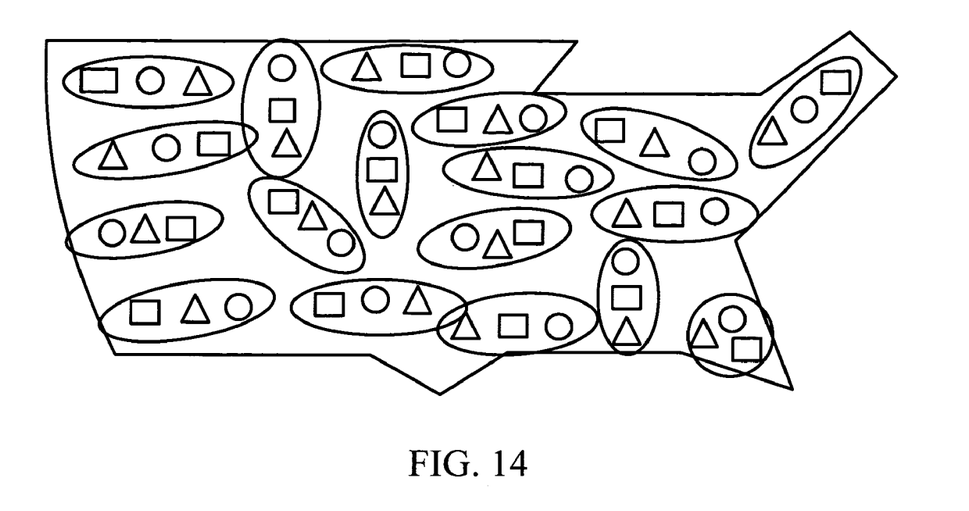
FIG. 14 shows a block diagram of CONUS divided into multiple regions.

FIG. 14 shows a simplified block diagram of the CONUS divided into multiple regions. Here, the CONUS is covered by 54 beams and geographically divided into three regions, namely west, central, and east regions. Also, there are 18 sets of 3 beams, in which each triangle, circle and square are assigned a portion of the available spectrum. A gateway supports each of the 18 sets for outbound traffic and inbound traffic. The gateways are then grouped, six at a time, into the west region, the central region and the east region. Here, the gateways may, for example, be located in the beams represented by the circles. It should be apparent to those skilled in the art that the CONUS can be covered using a different pattern of beams and/or a different division. In addition, the CONUS can be covered by a different number of beams and/or divided into more or less, regions.

Figure 15:
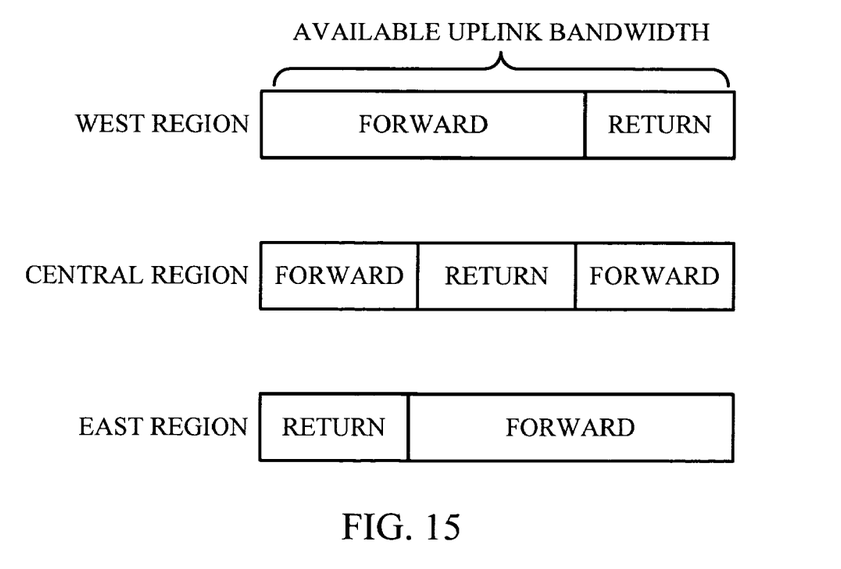
FIG. 15 shows an example of the spectrum assignments for the multiple regions.

FIG. 15 shows the spectrum assignments of the three regions, when three layouts are available. For the west region, the gateways transmit using the first and second portion of the uplink bandwidth while the terminals transmit using the third portion. In the central region, the gateways transmit using the first and third while the terminals transmit using the second portion. In the east region, the gateways transmit using the second and third while the terminal transmit using the first portion. The scheme allows for a smaller amount of net off-axis power radiated by the combined set of gateway transmissions and terminals transmitting from their respective geographic beam locations into the neighboring satellite system. Without this scheme, the net radiated power produced by the terminals from the same spectrum, would come from 18 beam locations and result in a more net power radiated into the neighbor satellite system. Hence, by using the spectrum shuffling scheme, with less total power radiated up to the neighbor system, allows for an increase in power for the terminals while still meeting the FCC required off-axis power limitation.

By mixing forward/uplink and return/uplink transmissions across the available bandwidth of the uplink, a more efficient and effective transmissions is achieved. Both gateways and terminals can produce transmissions throughout the full allocated uplink bandwidth, thereby reducing the net level of allowed off-axis power levels generated by the whole system. Terminals also receive the benefit of raising their power levels, resulting in higher SNR and greater capacity as well as more efficient use of the allocated spectrum. This leads to higher power allowances for the terminals, as a group, such that they can transmit at higher and more optimum power levels to improve the signal to noise ratio as well as the data rate, spectral efficiency and capacity for the system. Accordingly, system performance for both TDMA and CDMA uplink transmission waveform schemes is improved.

Furthermore it should be noted that the embodiments described above may be implemented by hardware, software, firmware, middleware, microcode, or any combination thereof. When implemented in software, firmware, middleware or microcode, the program code or code segments to perform the necessary tasks may be stored in a machine readable medium (not shown). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Therefore, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for transmitting forward/uplink and return/uplink signals within an available frequency bandwidth in a wireless communication system comprising:
    dividing a service area into multiple regions; and
    determining a minimum number of layouts required to service the multiple regions, where each layout comprises a unique pattern of forward/uplink and return/uplink signals, the layout patterns being constructed such that any layout will not interfere with the forward/uplink and return/uplink signals of different layout pattern employed in an adjacent region, and
    dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

2. The method of claim 1, further comprising: assigning a layout to one or more regions in such a manner of mitigating interference between any adjacent layouts.

3. The method of claim 1, wherein the wireless communication system is a multi-beam communication system.

4. The method of claim 1, further compnsing:
    determining the portions of the available frequency band to assign to the forward/uplink and the return/uplink is based upon at least one of type of signals being used, capacity of signals being used, geographical regions to be covered, number of terminals to be serviced, power available, or power requirements of the forward/uplink and the return/uplink, providing efficient utilization of the allocated frequency bandwidth.

5. Apparatus for a wireless communication system in which a forward/uplink portion and a return/uplink portion are assigned within an available frequency bandwidth, the apparatus comprising:
    means for dividing a service area into multiple regions;
    means for determining a minimum number of layouts required to service the multiple regions, where each layout comprises a unique pattern of forward/uplink and return/uplink signals, and the layout patterns being constructed such that any layout will not interfere with the forward/uplink and return/uplink signals of different layout pattern employed in an adjacent region; and
    means for dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

6. The method of claim 5, further comprising:
    means for assigning a layout to one or more regions in such a manner of mitigating interference between any adjacent layouts.

7. A method for receiving uplink transmission in which forward/uplink and return/uplink are assigned within an available frequency range compnsing:
    dividing a service area into multiple regions; and
    receiving the forward/uplink and the return/uplink signals in a mixed mode layout of the available frequency bandwidth, the mixed mode layout is one in a series of layouts and comprises a unique pattern of forward/uplink and return/uplink signals formed by dividing the available frequency bandwidth into a number of required portions facilitating creation of a series of unique pattern layouts, and the layout patterns being constructed such that any layout will not interfere with the forward/uplink and return/uplink signals of different layout pattern employed in an adjacent region.

8. Apparatus for receiving uplink transmission in which forward/uplink and return/uplink are assigned within an available frequency range, comprising:
    means for dividing a service area into multiple regions; and
    means for receiving the forward/uplink and the return/uplink signals in a mixed mode layout of the available frequency bandwidth, the mixed mode layout is one in a series of layouts and comprises a unique pattern of forward/uplink and return/uplink signals formed by dividing the available frequency bandwidth into a number of required portions facilitating creation of a series of unique pattern layouts, and the layout patterns being constructed such that any layout will not interfere with the forward/uplink and return/uplink signals of different layout pattern employed in an adjacent region.

9. A method for uplink transmission in which forward/uplink portion is assigned within an available frequency range, the method comprising:
    dividing a service area into multiple regions;
    determining a minimum number of layouts required to service the multiple regions, where each layout comprises a unique pattern of forward/uplink and return/uplink signals, and the layout patterns being constructed such that any layout will not interfere with the forward/uplink and return/uplink signals of different layout pattern employed in an adjacent region; and
    dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

10. The method of claim 9, further comprising: assigning a layout to one or more regions in such a manner of mitigating interference between any adjacent layouts.

11. The method of claim 10, further comprising: transmitting the forward/uplink signals in a region using the layout assigned to that region.

12. Apparatus for uplink transmission in which forward/uplink portion is assigned within an available frequency range, comprising:
    means for dividing a service area into multiple regions;
    means for determining a minimum number of layouts required to service the multiple regions, where each layout comprises a unique pattern of forward/uplink and return/uplink signals, and the layout patterns being constructed such that any layout will not interfere with the forward/uplink and return/uplink signals of different layout pattern employed in an adjacent region, and means for dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

13. The apparatus of claim 12, further comprising: means for assigning a layout to one or more regions in such a manner of mitigating interference between any adjacent layouts.

14. The apparatus of claim 13, further comprising: means for transmitting the forward/uplink signals in a region using the layout assigned to that region.

15. A method for uplink transmission in which return/uplink portion is assigned within an available frequency range, the method comprising:

dividing a service area into multiple regions;

determining a minimum number of layouts required to service the multiple regions, where each layout comprises a unique pattern of forward/uplink and return/uplink signals, and the layout patterns being constructed such that any layout will not interfere with the forward/uplink and return/uplink signals of different layout pattern employed in an adjacent region; and dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

16. The method of claim 15, further comprising: assigning a layout to one or more regions in such a manner of mitigating interference between any adjacent layouts.

17. The method of claim 16, further comprising: transmitting the return/uplink signals in a region using the layout assigned to that region.

18. Apparatus for uplink transmission in which return/uplink portion is assigned within an available frequency range, comprising:

means for dividing a service area into multiple regions;

means for determining a minimum number of layouts required to service the multiple regions, where each layout comprises a unique pattern of forward/uplink and return/uplink signals, and the layout patterns being constructed such that any layout will not interfere with the forward/uplink and return/uplink signals of different layout pattern employed in an adjacent region; and means for dividing the available frequency bandwidth into a number of required portions facilitating creation of the series of unique pattern layouts and assigning forward/uplink and return/uplink signals in accordance with each layout where the portion of forward/uplink plus the portion of return/uplink is less than or equal to the available frequency bandwidth.

19. The apparatus of claim 18, further comprising:

means for assigning a layout to one or more regions in such a manner of mitigating interference between any adjacent layouts.

20. The apparatus of claim 19, further comprising:

means for transmitting the return/uplink signals in a region using the layout assigned to that region.

\* \* \* \* \*